G. W. BELL.

METALLIC CANS.

No. 7,324. Reissued Sept. 26, 1876.

Witnesses:
Ernst Bilhuber.
George Bell.

Inventor.
Geo. W. Bell
per C. H. Borden
Atty

N. PETERS, PHOTO-LITHOGRAPHER, WASHINGTON, D. C.

UNITED STATES PATENT OFFICE.

GEORGE W. BELL, OF BROOKLYN, NEW YORK.

IMPROVEMENT IN METALLIC CANS.

Specification forming part of Letters Patent No. 167,870, dated September 21, 1875; reissue No. 7,324, dated September 26, 1876; application filed September 9, 1876.

*To all whom it may concern:*

Be it known that I, GEORGE W. BELL, of the city of Brooklyn, county of Kings and State of New York, have invented a new and useful Improvement in Metallic Cans; and I hereby declare the following to be a full, clear, and exact description thereof, reference being had to the accompanying drawing, forming a part of this specification, in which—

Figure 1:
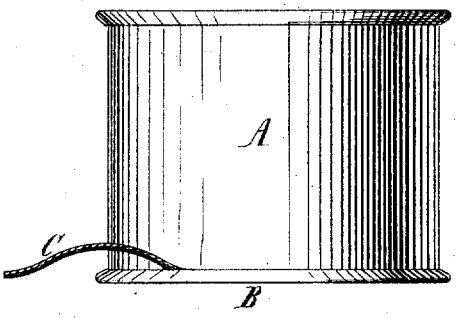
Figure 2:
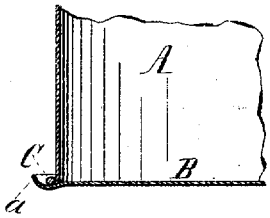
Figure 3:
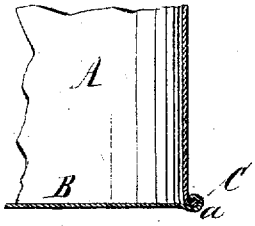
Figure 4:
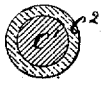

Figure 1 represents a side elevation of a completed can embodying my invention. Figs. 2 and 3 are sectional views, showing the construction of the seam-joint and arrangement of the packing-cord. Fig. 4 is a cross-section of a modified form of packing.

My invention consists in packing the crimped or folded seam-joints of sheet-metal vessels by inclosing within the same a fibrous or elastic cord with or without a projecting end, as hereinafter described and claimed.

In manufacturing cans embodying my invention a top or end, B, is constructed with a flange, *a*, projecting over the vertical sides of the can-body A sufficiently to inclose the cord or packing C.

The flange is turned over the cord and crimped snugly against the body of the can by suitable seaming-tools.

The packing-cord thus arranged serves a very useful purpose in making the seam-joint complete and water-tight.

If it is desired to open the flange *a* and to remove the top or end B without using mechanical appliances, I make the packing-cord of sufficient length to extend around the can and project beneath the flange, so that it may be grasped and pulled downwardly, thereby turning the flange outwardly, when the top may be readily removed.

The packing-cord may be composed wholly of a fibrous substance, or a wire coated with a fibrous substance or textile fabric, such as cloth, rubber, or paper, or a rubber cord may be used.

A wire, $C^1$, coated with rubber, $C^2$, is represented in cross-section, Fig. 4.

Having fully described my invention, what I claim, and desire to secure by Letters Patent, is—

1. A crimped or folded seam-joint of a sheet-metal vessel inclosing a fibrous or elastic packing-cord, substantially such as described, with or without a projecting end, all as set forth.

2. The can-body, A, having vertical sides, in combination with the flanged top or end B and packing-cord C, the flange *a* of the top being crimped or folded over said cord, substantially as described.

GEO. W. BELL.

Witnesses:

CHAS. W. FORBES,

GEORGE BELL.